United States Patent
Palacios Doñaque

(10) Patent No.: US 7,886,582 B2
(45) Date of Patent: Feb. 15, 2011

(54) DEVICE FOR MEASURING LOAD LOSS IN REVERSE OSMOSIS MEMBRANE CONTAINERS

(75) Inventor: Enric Palacios Doñaque, Barcelona (ES)

(73) Assignee: Acciona Agua, S.A.U., Alcobendas (Madrid) (ES)

( * ) Notice: Subject to any disclaimer, the term of this patent is extended or adjusted under 35 U.S.C. 154(b) by 428 days.

(21) Appl. No.: 12/106,442

(22) Filed: Apr. 21, 2008

(65) Prior Publication Data

US 2008/0289403 A1  Nov. 27, 2008

(30) Foreign Application Priority Data

May 23, 2007  (ES) ................. 200701402

(51) Int. Cl.
G01N 13/04 (2006.01)
G01N 15/08 (2006.01)

(52) U.S. Cl. ......................... 73/64.47; 73/38

(58) Field of Classification Search ............... 73/64.56, 73/38, 64.47; 210/85, 87, 90, 195.2, 650
See application file for complete search history.

(56) References Cited

U.S. PATENT DOCUMENTS

| | | | | |
|---|---|---|---|---|
| 4,790,942 A | * | 12/1988 | Shmidt et al. ............... | 210/650 |
| 5,203,803 A | * | 4/1993 | Schoenmeyr ................. | 417/38 |
| 5,261,792 A | * | 11/1993 | Schoenmeyr ................. | 417/38 |
| 5,460,723 A | * | 10/1995 | Bourbigot et al. ........... | 210/639 |
| 6,579,451 B1 | * | 6/2003 | Avero ....................... | 210/195.2 |
| 2010/0086420 A1 | * | 4/2010 | Del Pozo Polidoro et al. .... | 417/474 |

* cited by examiner

Primary Examiner—John Fitzgerald
(74) Attorney, Agent, or Firm—Wenderoth, Lind & Ponack, L.L.P.

(57) ABSTRACT

An interconnector coupled to a permeate water collection tube, establishing first and second groups of membranes, has open and closed ends, and orifices arranged circumferentially and located at a peripheral area in an intermediate section of the interconnector. The orifices establish a connection with an axial chamber provided in the interconnector and oriented towards the open end. The open end has a coupling nut connected to a pressure tube extending along the inside of the water collection tube section located between the interconnector and a feed inlet end. The pressure tube extends outside the pressure container through a closing cap of the end of the pressure container and ends in a T-shaped connection including a sensor for measuring the pressure of the non-treated reject water corresponding to the first group of membranes located between the feed inlet end and an assembly point of the interconnector.

4 Claims, 3 Drawing Sheets

DEVICE FOR MEASURING LOAD LOSS IN REVERSE OSMOSIS MEMBRANE CONTAINERS

OBJECT OF THE INVENTION

The present invention, according to the title of this descriptive report, refers to a device for measuring load loss in reverse osmosis membrane containers. This device has been specifically designed for situations in which the system comprises groups of membranes that are separated, each group engaged in different stages of the osmotic process. The device is based in incorporating a blind interconnector to the section of the permeate tube that separates the membranes corresponding to the stages of the osmosis system as established.

The object of the invention is to provide the means to measure the load loss at each stage of the process, that is, to measure the load loss of the different groups of membranes that are part of the installation, as well as to measure parameters such as rejection pressure, conductivity and temperature.

STATE OF THE ART

As it is known in the art, the desalination facilities that operate by means of a reverse osmosis principle based in turn on a system of membranes that permeate the salt water to obtain water that is suitable for consumption for certain uses, have the particularity that said membranes are housed in a pressure container and are correlatively linked together, this interconnection being achieved by a tube that collects the permeate water as it—the tube—goes through all the membranes so that the water that circulates inside the pressure container and goes through the membranes can reach said tube, and the permeate water obtained can be collected at the corresponding end of the tube located at the end of the container.

In normal facilities, the container that houses the permeable membranes through which the water to be treated circulates, has at one of its ends the inlet or feed input through which the water to be treated enters the system and an outlet or outflow at the opposite end to discharge the reject water or the non-treated water, as well as the output of the tube that serves to collect the permeate water.

In some cases it is necessary to establish, inside the same pressure container, two groups of membranes that will permit having inside the same container a reverse osmosis system in two stages, both said stages separated by a blind interconnector interleaved in the permeate water collection tube, and more specifically placed between the membranes that separate said groups or stages.

This arrangement allows obtaining two different qualities of permeate water from the two groups of membranes. It is possible to later incorporate a refining treatment for each of said different quality permeate waters according to the needs and/or type of consumption said waters are intended for.

However, there is a disadvantage associated to having two stages or two treatment groups inside the same container. This disadvantage is that it is not possible to know the composition or the pressure of the non-treated water flow coming from the last membrane of the first group, which membrane is positioned before the first membrane of the second group, and therefore it is not possible to know the net pressure of the flow feeding said first membrane of the second group.

This type of assembly comprising the two stages or groups presents yet another and more important disadvantage, since with this system it is not possible to know the load loss of each group of membranes placed inside the pressure container, and therefore it is not possible either to establish a complete operational model of the reverse osmosis system at hand.

DESCRIPTION OF THE INVENTION

The device object of the invention is capable of measuring the variables mentioned in the previous section based on the concept that the interconnection between the two membrane groups established inside the pressure container is achieved through an interconnector that has the particularity that one of its ends is an open end and the other one is a closed end.

Said interconnector, interleaved in the permeate water collection tube, has another particular characteristic which is that on an intermediate section in certain specific areas of the periphery of said tube, circumferential aligned orifices have been arranged, which communicate with a chamber oriented towards the open end of said interconnector. At this end a joint nut connects a small diameter pressure tube to the previously describe system, that travels axially inside of the permeate water collection tube corresponding to the group of membranes which load loss is going to be measured. This tube and arrangement also allow measuring other parameters such as the rejection pressure or the non-treated water, conductivity and temperature.

Said small diameter pressure tube extends outside the pressure container going through the lid, reaching and going through the inside of the exterior section corresponding to the permeate water collection tube until it reaches a "T-shaped" connector at which a pressure sensor is installed to measure the pressure of the reject or non-permeated water at the assembly part of the interconnector. In addition there are distal counterpressure means as well as flow means, also placed at the end, and their respective flow regulating valves that are mounted on the permeate water sections of the two groups of membranes.

On the other hand, the system also comprises a pressure sensor installed at the feed water inlet of the pressure container in order to measure the pressure of the water that enters the system, while another pressure gauge is installed in the reject water or non-treated water conduit to measure the pressure of said non-treated water.

Finally, both sections of the permeate water tube include, placed after the pressure meters, a flow regulating valve that contributes to see the effect of the interconnector separating the two groups of membranes, allowing the creation of counterpressure at each end of said permeate water sections, and allowing also to observe the influence said counterpressures have when applied to the assembly points of said regulating valves, to regulate the permeate water flow that goes through the membranes, and therefore to observe the pressure at the assembly point of the interconnector.

Said reject water can be analyzed by taking a sample of the non-treated reject water from the last membrane of the first group of membranes, and then calculate the osmotic pressure that serves in turn to calculate the net pressure feeding the second group of membranes, which allows forecasting the behaviour of the membranes in the second group of membranes.

In other words, the device object of the invention, when applied to an installation or pressure container containing reverse osmosis membranes for salt water assembled in two groups serves to measure the following parameters and obtain the following data:

1°.—Measurements of the load loss undergone by the different groups of membranes assembled inside the pressure container at a reverse osmosis installation.

2°.—It enables measuring the pressure of the chamber established in the interconnector, as well as collecting water samples at this precise point for chemical analysis purposes.

3°.—It enables collecting reject water samples and feed water samples from the membranes in which the interconnector has been installed.

4°.—It enables learning the counterpressure values at the end of each of the sections of the permeate water collection tube for each of the groups of membranes.

5°.—It enables learning the value of the permeate water flow at each end of the set of membranes.

6°.—It enables varying the counterpressure values of the permeate water independently for each one of the ends of the corresponding sections of the permeate water collection tube of each group of membranes, and also to observe the influence of said values on the load loss of the two groups of membranes where the connector has been installed.

7°.—It enables calculating the osmotic and net pressures of the non-treated reject water and the osmotic and net pressure of the feed water at the point where the interconnector is installed.

8°.—It enables measuring the temperature of all the water currents, general feed water, rejection water and water feeding the membranes where the interconnector is installed, as well as the temperature of the general reject water circuit, at each end of the different sections of the tube that carries the permeate water in both groups of membranes.

BRIEF DESCRIPTION OF THE FIGURES

To complement the following descriptions, and to contribute to a better understanding of the characteristics of the present invention, the following set of figures, as listed below, has been attached to this descriptive report. The descriptions of said figures will aid in the understanding of the innovations and advantages of the device object of the invention.

DESCRIPTION OF THE PREFERRED EMBODIMENT OF THE INVENTION

Figure 1:
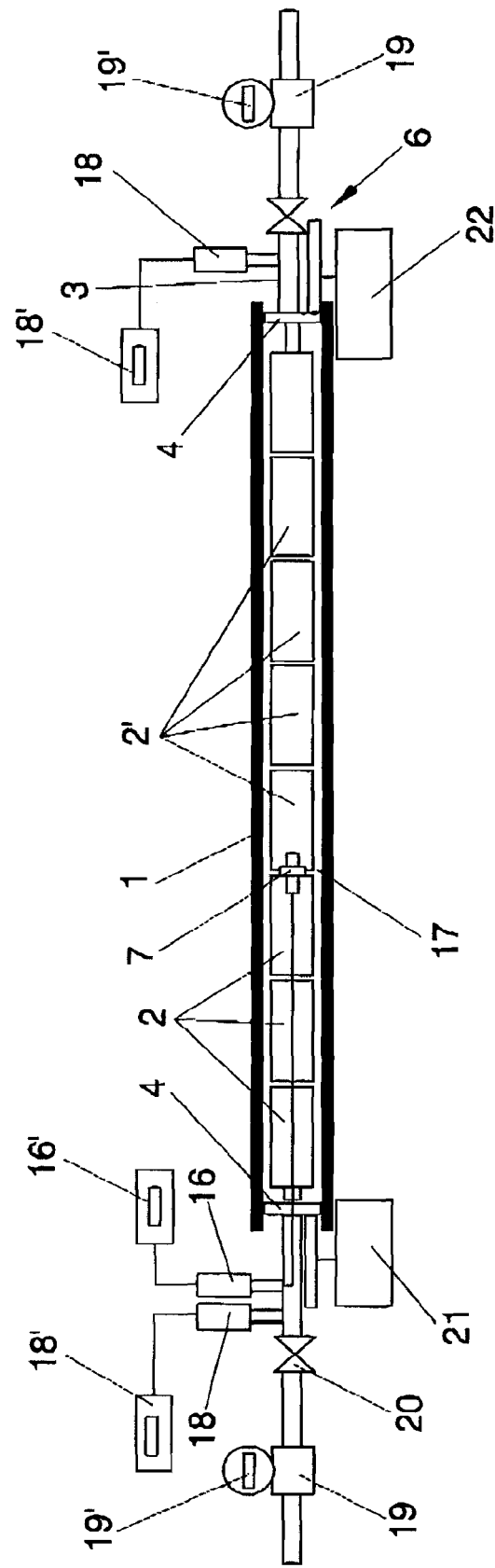
FIG. 1.—Shows the schematic outline of a reverse osmosis membrane installation in which the device object of the invention has been installed.

The figures show a reverse osmosis installation for the treatment of salt water that includes, as it is customary, a pressure container 1 inside of which the two membrane groups 2 and 2' are assembled, and correlatively interconnected together by means of a permeate water collection tube 3 that goes through the respective plugs 4 set at the end of the conveyance means that feed the water to be treated 5 and at the outlet end 6 of the reject water and of the permeate water.

The group of membranes 2 includes specifically three membranes, while the group of membranes 2' comprises five membranes, not ruling out that the first group may comprise two, four or five membranes, and the second group 2' may have six, three or two membranes, respectively.

Figure 2:
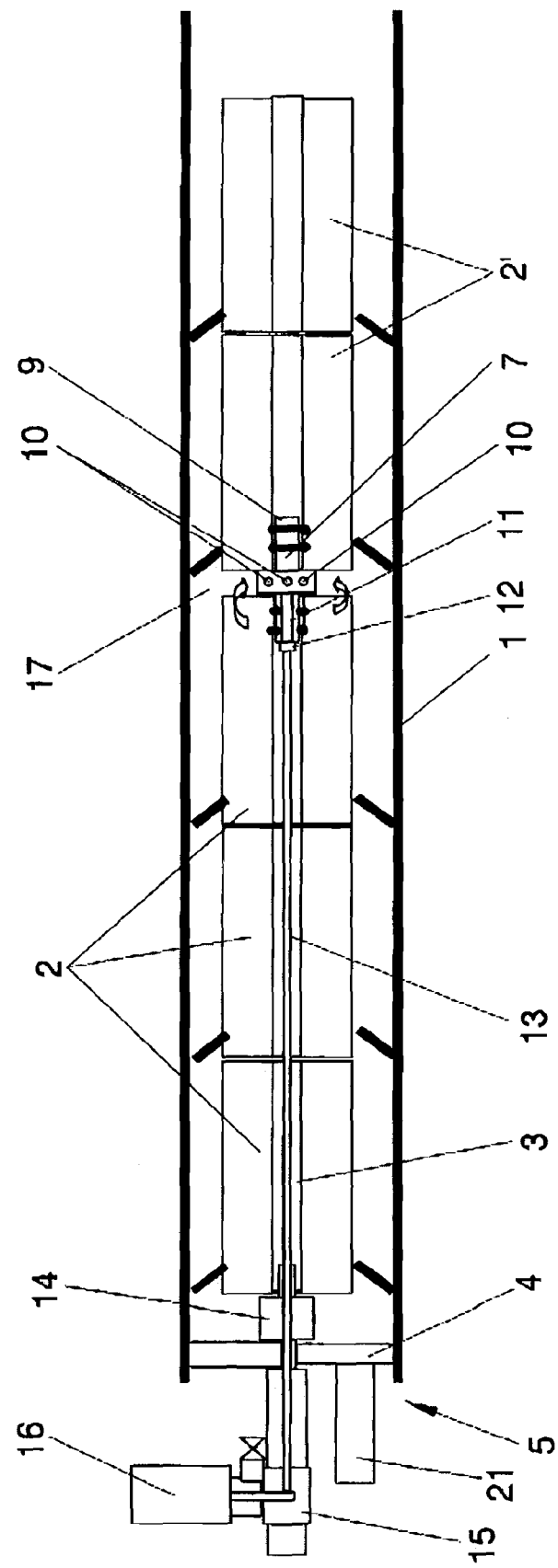
FIG. 2.—Shows an enlarged view, and at a larger scale of the section of the installation where the device object of the present invention has been installed, comprising the interconnector as fundamental element of the invention, as well as the group of membranes located between said interconnector and the inlet or feed input for the water to access the pressure container.
Figure 3:
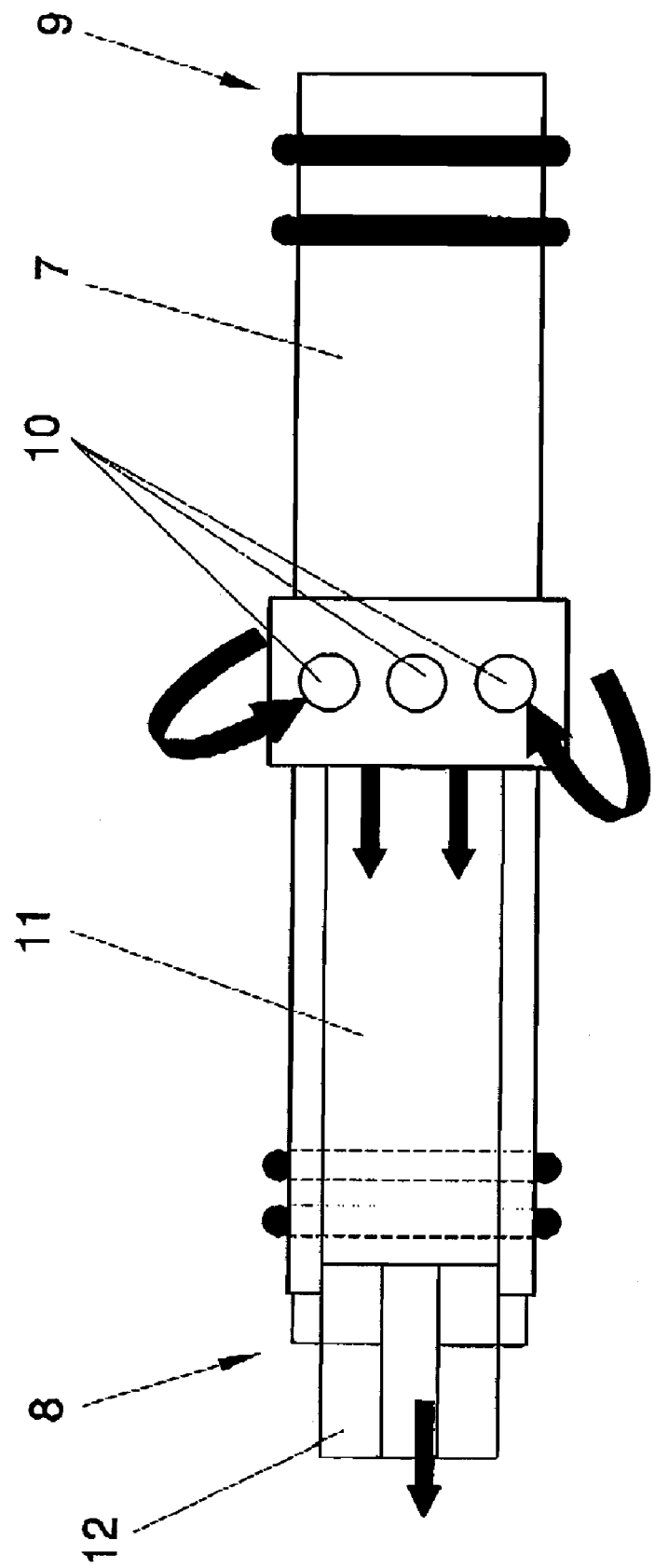
FIG. 3.—Shows an enlarged view of the interconnector assembled in the section of the installation shown in the previous figure.

In any case, both groups of membranes 2 and 2' will be determined by incorporating an interconnector 7 interleaved, or placed in between the permeate water collection tube 3 and separating both groups of membranes 2 and 2' as shown in FIGS. 1 and 2.

Said interconnector 7 has an open end 8 and an opposite closed end 9. It also has in an approximately intermediate and peripheral zone a series of orifices 10, distributed circumferentially, through which it communicates with a chamber 11. This chamber has a connection nut 12 fitted at its end, to which is connected a small diameter pressure tube 13 that travels axially inside the permeate water collection tube 3. Through a cylinder seal 14 goes the corresponding lid 4 placed at the water feed inlet 5 of the pressure container 1, following said pressure tube 13 externally by the permeate water collection tube 3 until reaching a "T"-shaped connection 15, where a pressure gauge sensor 16 is connected for the purpose of measuring the pressure of rejected water at point 17, or of the assembly of interconnector 7.

Pressure meters 18 have been installed at the respective ends of the installation, as well as the respective flow meters 19 with their respective flow regulating valves 20. These components are associated to their respective indicators of measurements 16', 18' and 19', all of them established at the corresponding sections of the permeate water collection tube 3 belonging to the two membrane groups 2 and 2'.

In addition, there is a pressure gauge 21 installed at the feed water inlet 5 connected to the pressure container 1 to measure the pressure at the installation point of entry, while there is a pressure gauge 22 installed at the outlet end of the installation to measure the pressure of the non-treated water.

Incorporating the pressure regulating valves 18 to the system enables the creation of counterpressure at each of the ends of the sections of the permeate water collection tube 3, which in turns allows observing how the counterpressures applied affect the respective points in terms of regulating the permeate water flow that goes through the membranes, and therefore to also observe the pressure at point of assembly 17 of the interconnector 7.

In other words, the device object of the invention and the complements mentioned above make possible to calculate the osmotic pressure of the water coming out of the last membrane of the second group of membranes 2, as well as calculating the load loss of both groups of membranes 2 and 2', enabling also to calculate the total load loss and the net feed pressure going to the set of membranes, in this latter case making also possible to predict the performance of the membranes of the second group 2', all of them parameters that are very useful when studying a reverse osmosis system or installation that works with membranes separated by an interconnector 7 as the one described.

The invention claimed is:

1. A DEVICE FOR MEASURING LOAD LOSS IN REVERSE OSMOSIS MEMBRANE CONTAINERS, being applicable in sea water or salty water desalination facilities and comprising a plurality of permeable membranes assembled inside a pressure container feeding the water to be treated through a feed inlet end, said membranes being correlatively connected together by a permeate water collection tube, the device further comprising an interconnector placed between two consecutive membranes of the plurality of membranes that serve to establish a first and a second groups of membranes on either side of said interconnector housed inside the pressure container, and wherein the interconnector is coupled to the permeate water collection tube establishing the first and the second group of membranes and presents an open end and a closed opposite end, as well as a plurality of orifices arranged circumferentially and located at a peripheral area corresponding to an approximately intermediate section of said interconnector, wherein said plurality of orifices establish a connection with an axial chamber comprised in the interconnector and oriented towards the open end of the interconnector, said open end comprising a coupling nut that connects the interconnector to a small diameter pressure tube that runs along the inside of a first section of the permeate water collection tube located between the interconnector and the feed inlet end; said pressure tube extending outside the pressure container after passing through a closing cap of an end of said pressure container and ending in a T-shaped connection comprising a sensor for measuring the pressure of non-treated reject water corresponding to the first group of membranes located between the feed inlet end and an assembly point of the interconnector.

2. DEVICE FOR MEASURING LOAD LOSS IN REVERSE OSMOSIS MEMBRANE CONTAINERS, according to claim 1, wherein each of an outlet end of the first section of the permeate water collection tube and an outlet end of a second section of the permeate water collection tube corresponding to the first and the second group of membranes comprises a pressure meter, as well as a flow meter and a flow regulating valve.

3. DEVICE FOR MEASURING LOAD LOSS IN REVERSE OSMOSIS MEMBRANE CONTAINERS, according to claim 2, wherein the feed inlet end that accepts the water to be treated inside the pressure container comprises a pressure gauge that measures the pressure of the water to be treated and an outlet end of the non-treated reject water comprises a pressure gauge that measures the pressure of the non-treated reject water.

4. DEVICE FOR MEASURING LOAD LOSS IN REVERSE OSMOSIS MEMBRANE CONTAINERS, according to claim 1, wherein the feed inlet end that accepts the water to be treated inside the pressure container comprises a pressure gauge that measures the pressure of the water to be treated and an outlet end of the non-treated reject water comprises a pressure gauge that measures the pressure of the non-treated reject water.

* * * * *